United States Patent [19]
Ito

[11] Patent Number: 5,950,028
[45] Date of Patent: Sep. 7, 1999

[54] CAMERA WITH A LENS BARRIER

[75] Inventor: Toru Ito, Saitama, Japan

[73] Assignee: Fuji Photo Optical Co., Ltd., Saitama, Japan

[21] Appl. No.: 08/989,009

[22] Filed: Dec. 11, 1997

[30] Foreign Application Priority Data

Dec. 12, 1996 [JP] Japan .................................. 8-332328

[51] Int. Cl.$^6$ .................................................. G03B 17/04
[52] U.S. Cl. .......................................... 396/349; 396/448
[58] Field of Search .................................. 396/348, 349, 396/439, 448, 535

[56] References Cited

U.S. PATENT DOCUMENTS 5,508,769   4/1996   Inoue et al. ............................ 396/349
5,602,607   2/1997   Kato et al. ............................. 396/349

FOREIGN PATENT DOCUMENTS 1255839   10/1989   Japan .

*Primary Examiner*—Safet Metjahic
*Assistant Examiner*—J. K. Han
*Attorney, Agent, or Firm*—Leydig, Voit & Mayer

[57] ABSTRACT

A camera includes a camera body and a retractable lens barrel. A lens barrier opens and closes the outlet for the lens barrel. A stopper is disposed slidable in the optical axis direction of the lens barrel. The stopper moves forward to lock the lens barrier when the lens barrel is moved forward, and moves backward to release the lens barrier when the lens barrel is moved backward.

6 Claims, 4 Drawing Sheets

CAMERA WITH A LENS BARRIER

BACKGROUND OF THE INVENTION

1. Field of the Invention

The present invention relates to a camera having a lens barrier for opening and closing an outlet for a retractable lens barrel.

2. Related Background Art

There is generally known a camera having a retractable lens barrel. The lens barrel is moved forward up to a predetermined position at the time of photographing and is moved backward to be stored within a camera body after photographing. A camera of this type can be compact and portable because the lens barrel is entirely stored within the camera body when the camera is not used.

Moreover, a camera having a lens barrier for opening and closing an outlet for a retractable lens barrel has been developed. When the camera is not used, the lens barrel is entirely stored within the camera body, and the outlet for the lens barrel is completely covered with the lens barrier. At the time of photographing, the lens barrier is opened, and the lens barrel is moved forward up to a predetermined position, so that the camera is in a stand-by state. According to this camera, when the camera is not used, the lens barrel is not seen from the outside, so that the camera has an excellent appearance.

SUMMARY OF THE INVENTION

In a camera having a lens barrier for opening and closing an outlet for a retractable lens barrel, the lens barrier must be locked while the lens barrel is kept outside of the camera body. That is, if the lens barrier is closed while the lens barrel is kept in outside of the camera body, the lens barrier hits against the side wall of the lens barrel, and the lens barrel or lens barrier may be damaged.

It is, therefore, an object of the present invention to provide a compact camera including a locking mechanism for a lens barrier which has a simple and compact structure.

A camera according to the present invention comprises a camera body, a lens barrel retractable with respect to the camera body, a lens barrier for opening and closing an outlet for the lens barrel, and a stopper disposed in the camera body to be movable in an optical axis direction of the lens barrel. The stopper moves forward to lock the lens barrier when the lens barrel is moved forward, and moves backward to release the lens barrier when the lens barrel is moved backward.

In this case, more preferably, the camera further comprises a spring for biasing the stopper against the lens barrier, and an interlocking device moving the stopper backward in connection with a backward motion of the lens barrel.

The interlocking mechanism preferably comprises a shaft penetrating through a wall of a lens barrel chamber, a first arm extending from one end of the shaft to contact with the lens barrel, and a second arm extending parallel to the first arm from the other end of the shaft to engage with the stopper.

In addition, a distance from an axis of the shaft to a contact position between the first arm and the lens barrel is longer than a distance from the axis of the shaft to an engagement position between the second arm and the stopper.

The interlocking mechanism may be a pin attached at a rear end of the stopper to contact with a rear end of the lens barrel.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
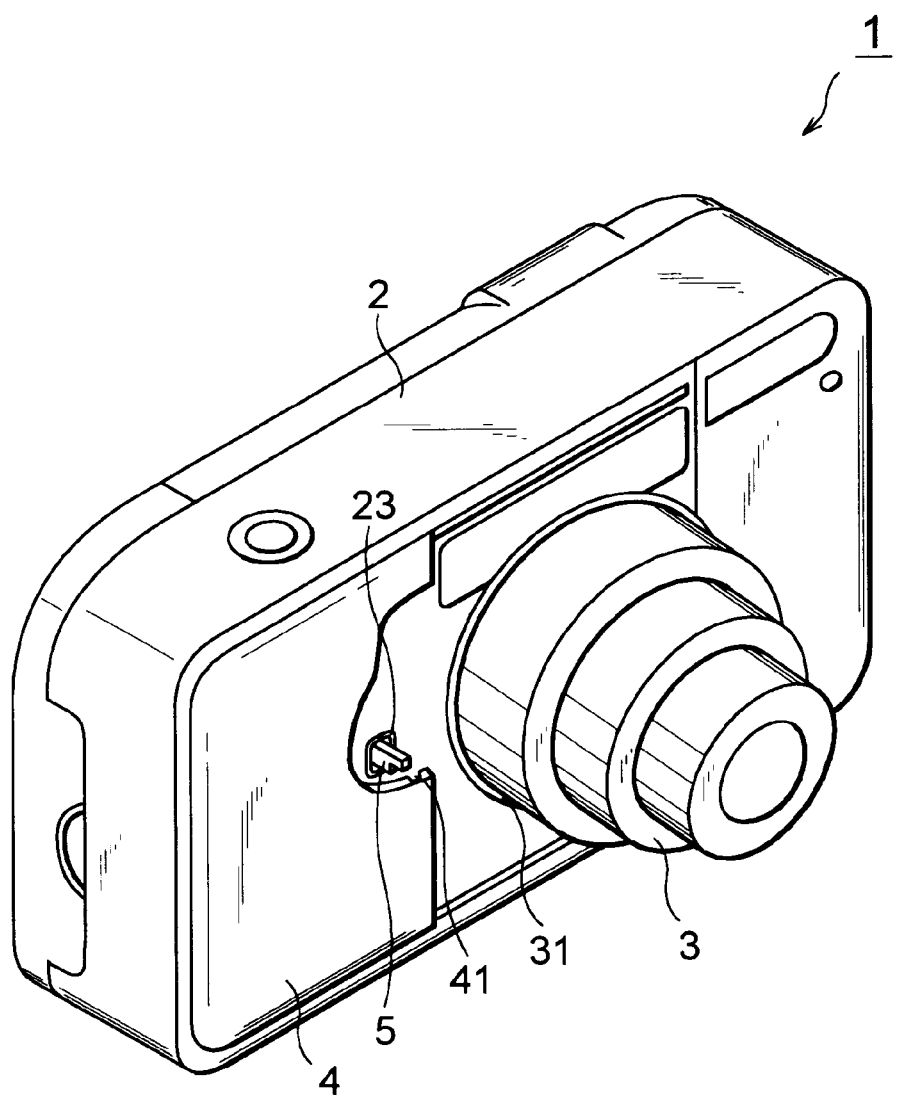
FIG. 1 is a perspective view showing a camera according to the present invention.

FIG. 1 is a perspective view showing a camera to which the present invention is applied. As shown in FIG. 1, a camera 1 has a retractable lens barrel 3. At the time of photographing the lens barrel is moved forward up to a predetermined position. The lens barrel 3 is projected from a front surface 21 of the camera body 2, so that the camera 1 is in a stand-by state. On the contrary, the lens barrel 3 is moved backward to be stored within a camera body 2 after photographing. The forward and backward movement of the lens barrel 3 is controlled by a controller and a driver (neither of which are shown) included within the camera body 2.

A lens barrier 4 is attached to the camera body 2 to be movable along the front surface 21. The lens barrier 4 opens and closes an outlet 31 for lens barrel 3. The lens barrier 4 is attached to be slidable laterally along the front surface 21 of the camera body 2. FIG. 1 shows a state in which the lens barrier 4 is opened. When the lens barrel 3 is stored within the camera body 2 and the lens barrier 4 is closed, the outlet 31 is completely covered with the lens barrier 4. While the lens barrier 4 is kept closed, the appearance of the camera 1 becomes simple, because the lens barrel is not seen from the outside. Note that the means for opening and closing the outlet 31 for the lens barrel 3 is not limited to the lens barrier 4 which is slidable laterally along the front surface 21, but a vertically movable lens barrier along the front surface, a lens barrier pivoting around an axis on the front surface 21, a lens barrier movable inside the front surface 21, or any other lens barriers may be used if such a means can open and close the outlet 31.

Figure 2:
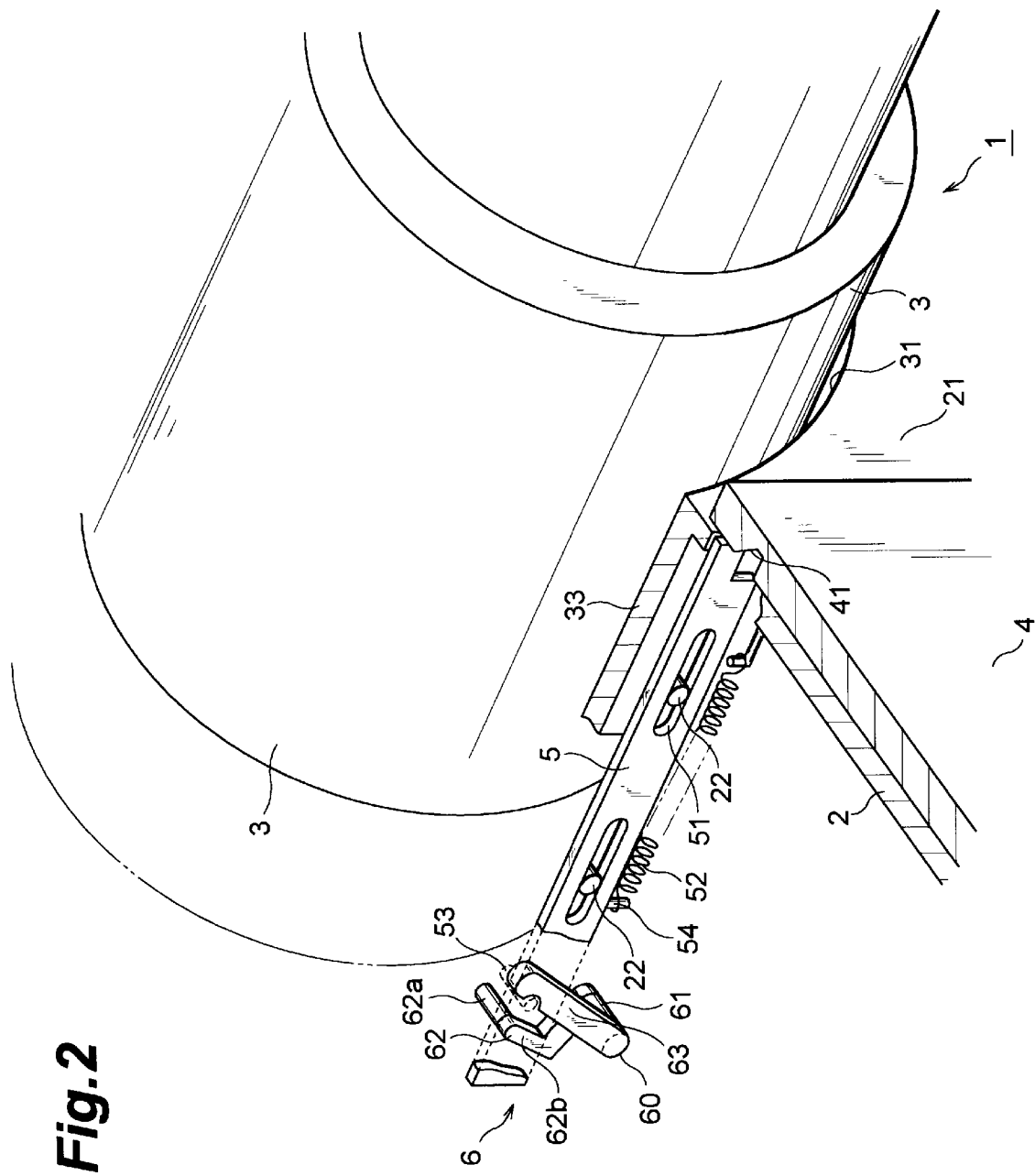
FIG. 2 is a perspective view for explaining the internal structure of the camera shown in FIG. 1.

As shown in FIG. 2, a recess 41 is formed in the inner surface of the lens barrier 4. In the recess 41, a stopper 5 disposed in the camera body 2 is capable of being inserted.

When the stopper 5 is inserted in the recess 41, the lens barrier 4 is locked to be kept in an open position. As a result, the barrier can not be closed. The recess 41 has an inclined surface 41a (see FIGS. 4 and 5). The inclined surface 41a is formed by chamfering the edge located on the lens barrel 3 side when the lens barrier 4 is opened (the state in FIG. 2). Even if the stopper 5 is inserted in the recess 41, the lens barrier 4 is easily moved in the direction of opening the lens barrier 4 by this inclined surface 41a.

In the camera body 2, a switch (not shown) is provided. The switch is operated in accordance with the opening or closing motion of the lens barrier 4. When the lens barrier 4 is opened, the switch is operated to move the lens barrel 3 forward, so that the camera 1 is in a stand-by state.

The stopper 5 is disposed in the camera body 2 to be slidable in the optical axis direction of the lens barrel 3. As shown in FIG. 2, the stopper 5 is an elongated plate which is disposed along a wall 33 forming an lens barrel chamber 32 for housing the lens barrel 3. The wall 33 divides the lens barrel chamber 32 and a space where the stopper 5 is disposed. The stopper 5 is slidable in parallel with the optical axis of the lens barrel 3. Slots 51 are formed in the stopper 5 along the longitudinal direction of the stopper 5. Pins 22 extending from the camera body 2 in the moving direction of the lens barrier 4 are respectively inserted into the slots 51. The stopper 5 is slidable along the pins 22. As a result, a space for arranging the stopper 5 is decreased, so that the camera 1 can be compact. Note that any other way can be employed as the structure for mounting stopper 5, if the stopper 5 is slidable in the optical axis directions of the lens barrel 3, i.e., the movement direction of the lens barrel 3.

Figure 3:
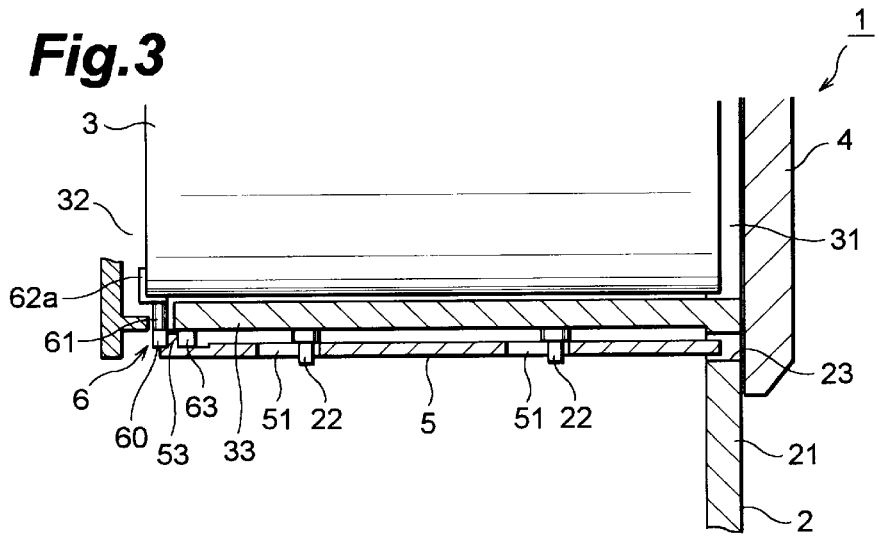
FIG. 3 is a partial sectional view for explaining the operation of the camera shown in FIG. 1.
Figure 5:
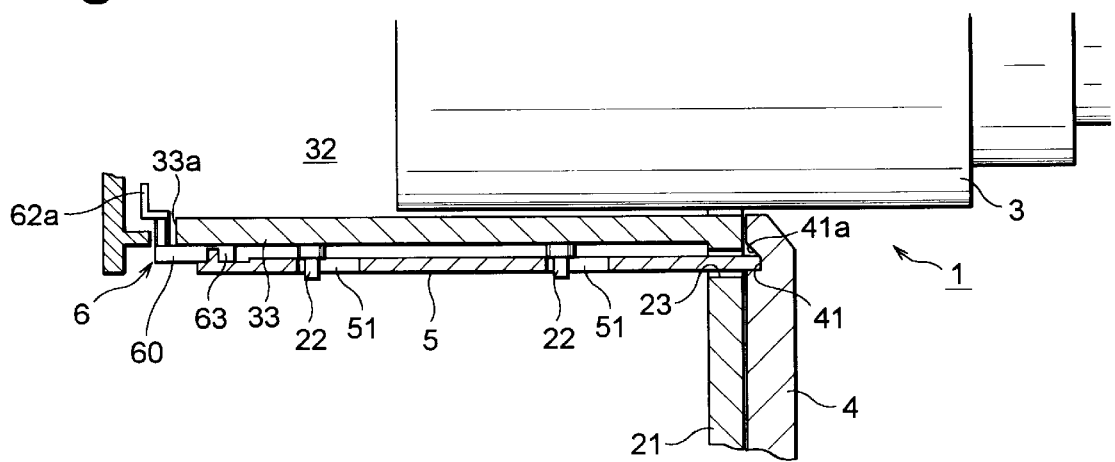
FIG. 5 is a partial sectional view for explaining the operation of the camera shown in FIG. 1.

A pin 54 extends from the end portion of the stopper 5 on the rear side of the camera 1. As shown in FIG. 2, one end of a helical tension spring 52 is hooked on the pin 54. The other end of the spring 52 is hooked to the camera body 2 on the front surface 21 side. The stopper 5 is biased against the lens barrier 4 (front surface 21) by a contraction of the spring 52. This biasing means is not limited to the spring 52. Any other biasing means may be used if the stopper 5 can be biased against the front surface 21. As shown in FIG. 3, a opening 23 is formed on the front surface 21 of the camera body 2. When an interlocking device 6 (to be described later) is not operated, the stopper 5 projects from the opening 23 by the biasing force of the spring 52. As a result, even if the user wants to close the lens barrier 4 while the lens barrel 3 is kept in the outside of the camera body 2, as shown in FIG. 5, the lens barrier 4 is not closed because the stopper 5 projects from the opening 23 to be inserted in the recess 41 of the lens barrier 4.

Figure 4:
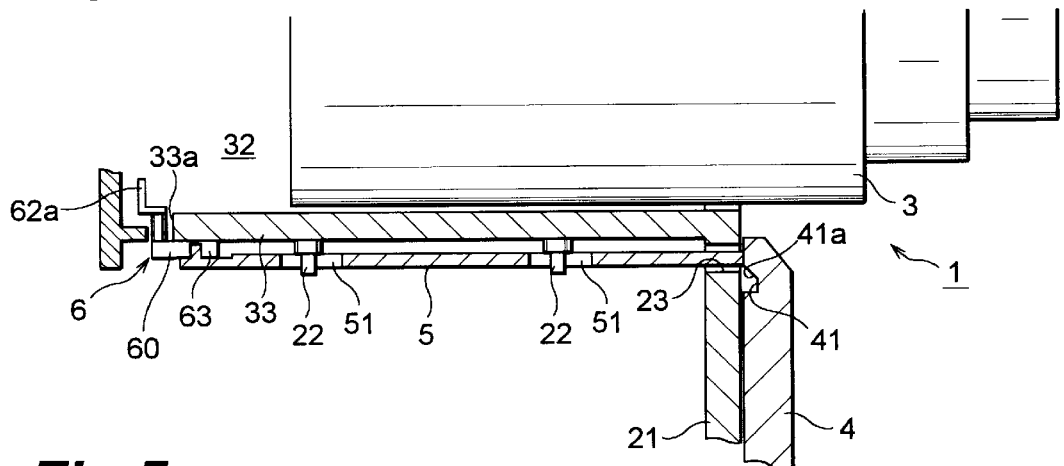
FIG. 4 is a partial sectional view for explaining the operation of the camera shown in FIG. 1.
Figure 6:
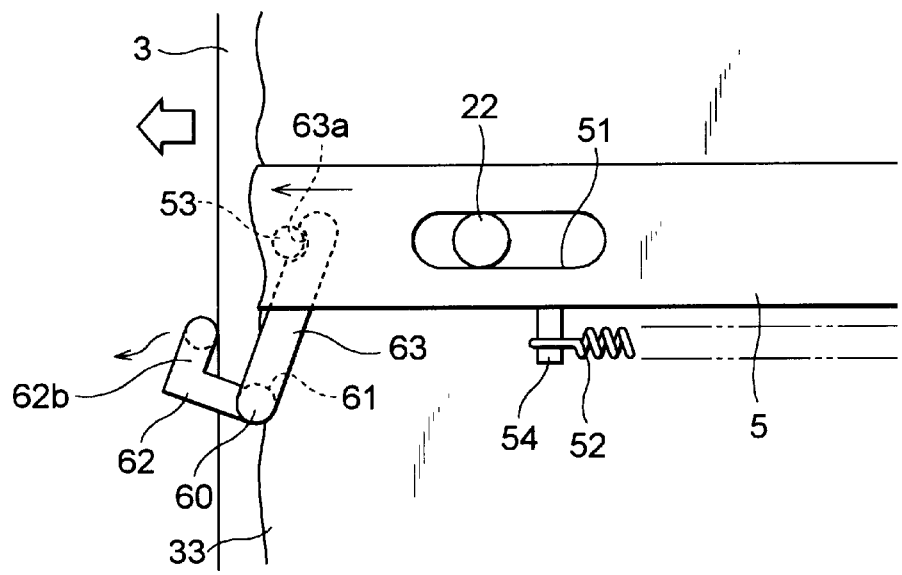
FIG. 6 is an enlarged detailed view for explaining the internal structure of the camera shown in FIG. 1.

As shown in FIG. 2, the interlocking device 6 is arranged in the camera body 2. The interlocking device 6 is interlocked with a backward movement of the lens barrel 3 and moves the stopper 5 backward (toward the rear side of the camera 1). As shown in FIG. 2, the interlocking device 6 comprises a lever 60 including a shaft 61. The shaft 61 has a small-diameter cylindrical shape. An L-shaped first arm 62 extends from one end of the shaft 61. A pin 62a extends parallel to the shaft 61 from the head of the first arm 62. Moreover, a second arm 63 extends from the other end of the shaft 61 to be parallel to a free end portion 62b of the first arm 62. A recess 63a (see FIG. 6) is formed at the head of the second arm 63. As shown in FIG. 4, the shaft 61 of the lever 60 is disposed to penetrate through the wall 33 forming lens barrel chamber 32. The lever 60 is rotatable about the shaft 61. The first arms 62 is disposed on the lens barrel 3 side and the second arms 63 is disposed on the space where the stopper 5 is disposed. The wall 33 is located between the first arm 62 and the second arm 63. As shown in FIG. 6, the pin 62a extending from the first arm 62 is capable of contacting with the rear end of the lens barrel 3. The recess 63a formed in the second arm 63 is engaged with a pin 53 formed on the stopper 5. As a result, when the lens barrel 3 is moved backward, the first arm 62 is moved toward the rear side of the camera 1 (right side in FIG. 6) together with the lens barrel 3 while pivoting on the shaft 61. At the same time, the second arm 63 pivots on the shaft 61 so as to move the stopper 5 engaged with the second arm 63 toward the rear side of the camera 1 against the biasing force of the spring 52.

The interlocking device 6 using the lever 60 can reliably transmit a force generated by the backward movement of the lens barrel 3 to the stopper 5 through the shaft 61. That is, the stopper 5 can be reliably moved toward the rear side of the camera 1 by using the backward movement of the lens barrel 3. Since the diameter of the shaft 61 is small, the diameter of a hole 33a to be formed in the wall 33 can also be small. As a result, a large gap is not formed between the space where the stopper 5 is disposed inside of the lens barrel chamber 32. Therefore, light is not incident into the lens barrel chamber 32 for the lens barrel 3 from the space in which the stopper 5 is disposed, so that film exposure can be free from any problem.

In the lever 60, the length of the free end portion 62b of the second arm 62 is designed to be larger than the distance between the axis of the shaft 61 and the recess 63a. More specifically, it is preferable that the distance from the axis of the shaft 61 to the contact position between the first arm 62 and the lens barrel 3 be longer than the distance from the axis of the axis 61 to the engagement position between the second arm 63 and the stopper 5. Therefore, the pivoting radius of the second arm 63 is larger than that of the first arm 62, so that the moving distance of the stopper 5 is longer than the moving distance of the pin 62a along the optical axis direction of the lens barrel 3. Accordingly, when the lens barrel 3 is to be moved into the camera body 2, the stopper 5 can be immediately moved backward by the rotation of the lever 60 and the locking of the lens barrier 4 can be quickly and reliably released.

According to the locking mechanism, when the lens barrel 3 is kept outside of the camera body 2, the closing movement of the lens barrier 4 can be reliably prevented. Moreover, the closing movement of the lens barrier 4 can be started almost simultaneously when the lens barrel 3 is moved backward.

Next, the operation of the camera 1 will be described below.

As shown in FIG. 3, when the camera 1 is not used, the lens barrel 3 is entirely stored in the camera body 2, and the lens barrier 4 is kept closed, so that the outlet 31 of the lens barrel 3 is completely covered with the lens barrier 4. At this time, since the lens barrel 3 is stored within the camera body 2, the stopper 5 is pulled toward the rear side of the camera 1 (right side in FIG. 3) by the interlocking device 6. The head of the stopper 5 does not project from the opening 23.

In this state, when the lens barrier 4 is fully opened as shown in FIG. 4, a switch (not shown) in the camera body 2 is turned on, and the lens barrel 3 starts to be moved forward through the outlet 31. When the lens barrel 3 is moved forward in this manner, the pin 62a formed on the first arm 62 of the lever 60 is released from the rear end of the lens barrel 3 as shown in FIG. 4, that is, the stopper 5 is released from the interlocking device 6. The stopper 5 is moved toward the front surface 21 side by the biasing force of the spring 52 and contacts the inner surface of the lens barrier 4. When the lens barrel 3 is moved forward up to a predetermined position, the camera is in the stand-by state.

In this state, when the user tries to close the lens barrier 4, the closing movement of the lens barrier 4 is prevented by the stopper 5. More specifically, when the lens barrier 4 is closed, the recess 41 is moved to the front of the opening 23. Then, the stopper 5 projects from the opening 23 and is inserted in the recess 41, as shown in FIG. 5. When the stopper 5 is inserted in the recess 41, the lens barrier 4 is locked by the stopper 5 and cannot move toward the lens barrel 3 side (closing direction) any further. The lens barrier 4 is prevented from being closed when the lens barrel 3 is kept outside of the camera body 2. As a result, the lens barrier 4 can be prevented from hitting against the side wall of the lens barrel 3. Moreover, the lens barrier 4 can be locked by a simple and compact mechanism, so that the camera is reliably operated and free from any trouble such as a failure.

If the lens barrier 4 is closed to be in a state as shown in FIG. 5 when the lens barrier 4 is fully opened (see FIG. 4), a switch (not shown) in the camera body 2 is operated to move the lens barrel 3 backward. In this case, by fully opening the lens barrier 4 again (see FIG. 4), the lens barrel 3 can be moved forward. That is, since the inclined surface 41a is formed in the recess 41 of the lens barrier 4, it is easy to change the state in which the stopper 5 is kept inserted in the recess 41, as shown in FIG. 5, to the state in which lens barrier 4 is fully opened, as shown in FIG. 4. As a result, when the user erroneously tries to close the lens barrier 4, the lens barrel 3 can be moved forward and the camera can be in the stand-by state without waiting for completely storing the lens barrel 3 within the camera body 2. Therefore, operability can be improved.

After photographing, the lens barrel 3 is started to move backward, by closing the lens barrier 4 or a predetermined switch operation. When the head of the lens barrel 3 reaches the vicinity of the outlet 31, the rear end of the lens barrel 3 contacts the pin 62a formed on the first arm 62 of the lever 60, as shown in FIG. 6. When the lens barrel 3 is further moved backward, the first arm 62 pivots toward the rear surface side of the camera 1 (the left side in FIG. 6). At the same time, the shaft 61 rotates in accordance with the motion of the first arm 62, and the second arm 63 pivots toward the rear surface side of the camera 1. The force can be reliably transmitted from the lens barrel 3 side to the stopper 5 side through the shaft 61 of the lever 60. At this time, light does not leak from the stopper 5 side to the lens barrel chamber 32. The stopper 5 slides together with the lens barrel 3 moving backward toward the rear side of the camera 1, and the head of the stopper 5 is released from the recess 41. Therefore, prevention of the closing the lens barrier 4 is canceled, and the lens barrier 4 can be closed.

According to the camera 1 of the present embodiment, the stopper 5 for locking the lens barrier 4 is disposed to be slidable in the optical axis direction of the lens barrel 3. Moreover, the locking of the lens barrier 4 is easily canceled by interlocking the stopper 5 with the backward movement of the lens barrel 3 without converting the direction of the force in the backward movement of the lens barrel 3. Therefore, the locking of the lens barrier can be reliably carried out by a simple mechanism, and a locking mechanism for the lens barrier can be made compact, so that the camera can be compact.

As has been described above, the lever 60 is used as the interlocking device 6 in the camera 1, but, the interlocking device 6 is not limited to the lever 60. If the interlocking device 6 allows the stopper 5 to interlock with the backward movement of the lens barrel 3, other mechanism such as a gear train may be used. It is important that the camera body 2 have a structure in which light is not incident to the lens barrel chamber 32 from the space for the stopper 5. Preferably, in such a mechanism, the shaft 61 penetrating through the wall 33 is adopted to transmit a force from the lens barrel 3 to the stopper 5.

Figure 7:
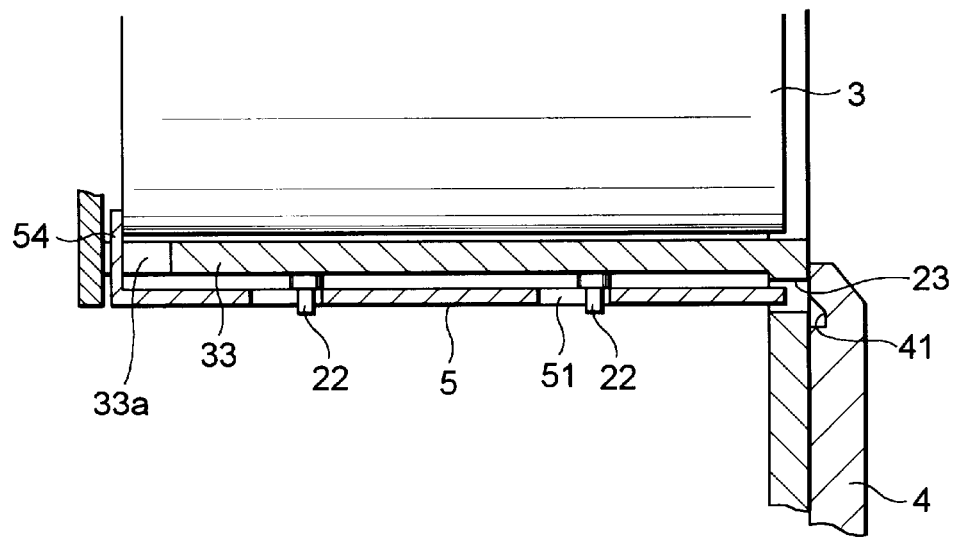
FIG. 7 is a partial sectional view showing another embodiment of the present invention.

Moreover, the interlocking device 6 is separated from the stopper 5 in the camera 1, but, the interlocking device 6 is not limited to this structure. The stopper 5 may serve also as an interlocking device. In this case, as shown in FIG. 7, a pin 54 is extended from the rear end of the stopper 5. The pin 54 is capable of contacting with the rear end of the lens barrel 3. As a result, the stopper 5 can be interlocked with the backward movement of the lens barrel by a simple and compact structure.

As has been described above, the present invention has the following effects. That is, a stopper is disposed in the camera body to be movable along an optical axis direction of the lens barrel. The stopper moves forward to lock the lens barrier when the lens barrel is moved forward and moves backward to release the lens barrier when the lens barrel is moved backward. As a result, it is possible to provide a compact camera including a locking mechanism for a lens barrier which has a simple compact structure and high performance.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A camera comprising:

a camera body having an outlet;

a lens barrel retractable with respect to the camera body through the outlet;

a lens barrier movable between an open and closed position for opening and closing the outlet;

a stopper disposed in the camera body and movable in an optical axis direction of the lens barrel, the stopper moving forward to lock the lens barrier against movement between its open and closed position when the lens barrel is moved forward, and moving backward to permit the lens barrier to move between its open and closed position when the lens barrel is moved backward;

a spring for biasing the stopper against the lens barrier; and an interlocking device moving the stopper backward in connection with a backward motion of the lens barrel and comprising a shaft penetrating through a wall of a lens barrel chamber, a first arm extending from one end of the shaft to contact with the lens barrel, and a second arm extending from another end of the shaft to engage with the stopper.

2. A camera according to claim 1, wherein a distance from an axis of the shaft to a contact position between the first arm and the lens barrel is longer than a distance from the axis of the shaft to an engagement position between the second arm and the stopper.

3. A camera according to claim 1, wherein the first arm has a pin extending parallel to the shaft for contacting the lens barrel, and the second arm extends parallel to a portion of the first arm.

4. A camera according to claim 1, wherein the lens barrier is movably mounted on the camera body.

5. A camera according to claim 1, wherein the lens barrier is slidably supported by the camera body for movement along a front surface of the camera body.

6. A camera according to claim 1, wherein the stopper projects through an opening in the camera body when locking the lens barrier.

* * * * *